H. W. ROGERS.
SYNCHRONIZING MECHANISM FOR MOTION PICTURE AND SOUND REPRODUCING MACHINES.
APPLICATION FILED NOV. 18, 1916.

Harrison W. Rogers,
Inventor

H. W. ROGERS.
SYNCHRONIZING MECHANISM FOR MOTION PICTURE AND SOUND REPRODUCING MACHINES.
APPLICATION FILED NOV. 18, 1916.
1,255,823.
Patented Feb. 5, 1918.
3 SHEETS—SHEET 3.
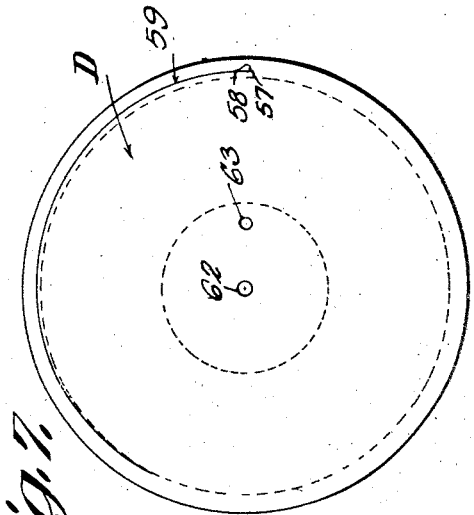
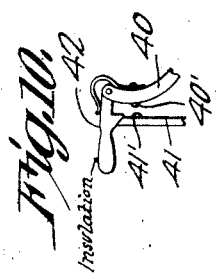
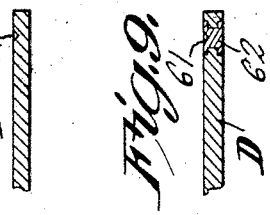
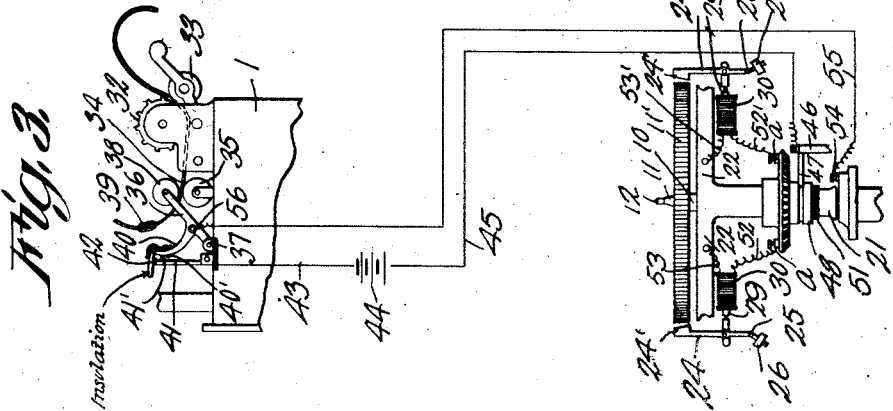
Witnesses
Harrison W. Rogers,
Inventor
by
Attorneys

UNITED STATES PATENT OFFICE.

HARRISON W. ROGERS, OF WHEELING, WEST VIRGINIA.

SYNCHRONIZING MECHANISM FOR MOTION-PICTURE AND SOUND-REPRODUCING MACHINES.

1,255,823. Specification of Letters Patent. Patented Feb. 5, 1918.

Application filed November 18, 1916. Serial No. 132,118.

*To all whom it may concern:*

Be it known that I, HARRISON W. ROGERS, a citizen of the United States, residing at Wheeling, in the county of Ohio and State of West Virginia, have invented a new and useful Synchronizing Mechanism for Motion-Picture and Sound-Reproducing Machines, (Case B,) of which the following is a specification.

The present invention relates to improvements in synchronizing transmission mechanisms for motion picture and sound record carriers, one object of the invention being the provision of a synchronizing mechanism operably connected to and incased in the casing of a sound reproducing machine, and having a shaft for operable connection with the motor of a projector mechanism of a motion picture machine, the synchronizing mechanism being provided with an electrically controlled clutch means which is set in operation by coöperative means carried by and disposed in the path of the film, such means being set forth broadly and specifically in the application for patent for improvements in synchronizing mechanism for motion picture and sound reproducing machines filed Feb. 7, 1913, Serial No. 746,890.

In the present instance, the main clutch member and the means for operating the same are operably connected at all times with the motor of the projector, so that the same is rotated at the primary rotation of and with the projector motor, there being provided means disposed upon and in the path of the film to actuate the rotating clutch member to place the same in an operable engagement with the disk carrying platform so that the disk at the proper time will be rotated and held in operable connection with the projector mechanism so that the sound produced thereby will be in harmony or in synchronism with the projection of the images from the film, the projector mechanism controlling entirely the operation of the sound record carrier, while the film controls the operation of the clutch to connect the sound record carrier at the proper instant with the projector mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—

Fig. 3 is an electrical diagram illustrating the film controlled switch and the electromotors for operating the movable clutch members to connect the platform carrying member of the record disk with the rotatable member.

Figs. 7, 8 and 9 are detail views showing the disk provided with the depression and groove for properly positioning the reproducer stylus thereupon.

Fig. 10 is an enlarged detail view of the switch operated by the film showing the means for locking the same in closed position during the operation of the sound record carrier.

Figure 1:
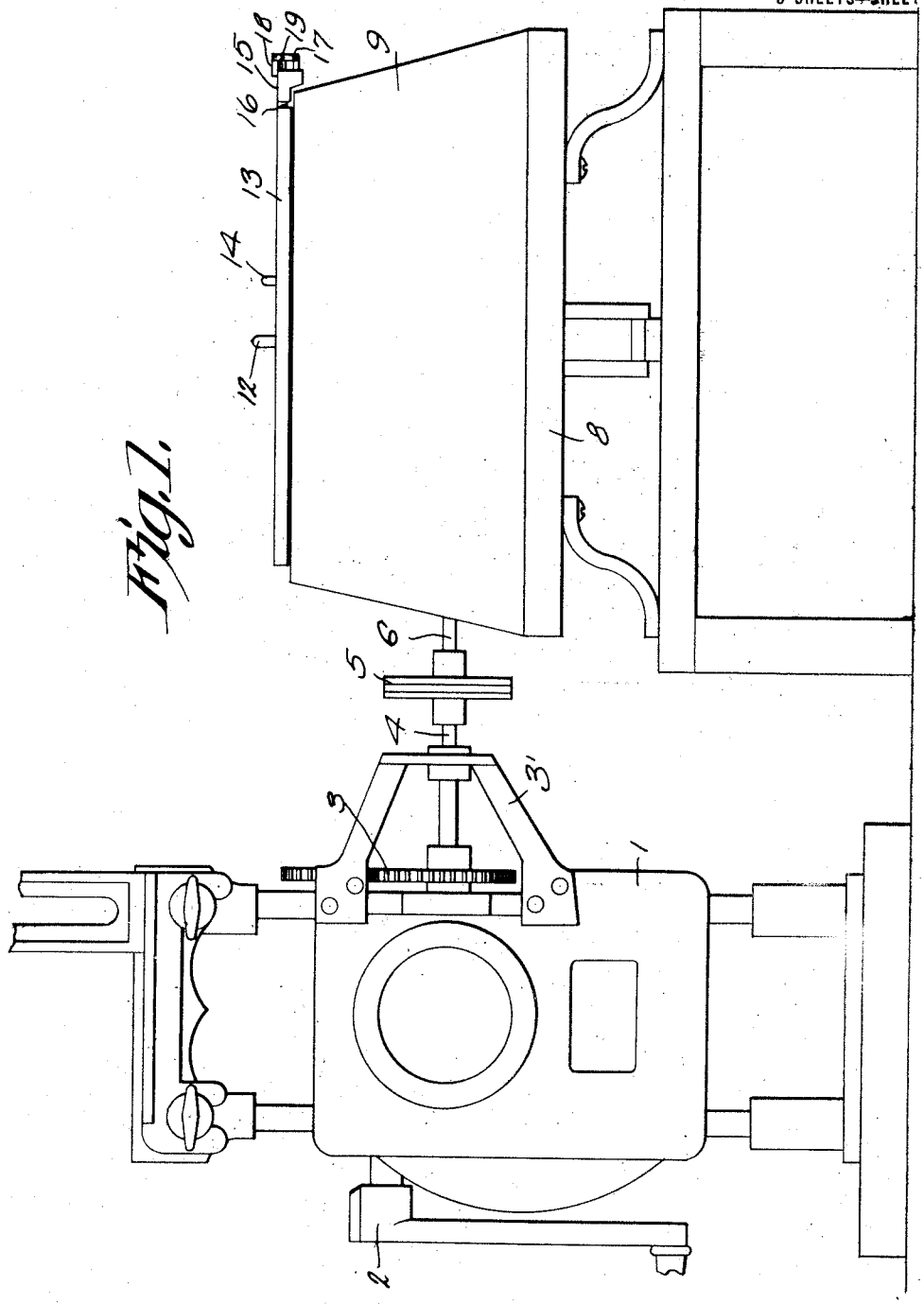
Figure 1 is a front elevation of a projector mechanism operably connected to a disk sound record carrier, the casing for the synchronizing mechanism being shown in elevation.

Referring to the drawings, the numeral 1 designates the casing of the projector, provided with a hand operated crank 2, which however, may be displaced by a motor where a motor is used, such projector as herein shown, being indicative of any form of projector mechanism that is now used or may be used, and having a gear wheel 3, which is one of the gears of the motor thereof. This gear wheel 3 may be positioned at various parts of the machine according to the projector upon which the present device is adapted to be used, it simply being desirable to operably connect the motor to the drive shaft 6 through any mechanism that may be readily attached to the projector casing.

In the present instance, the bracket 3' is detachably connected to the projector casing, and has journaled therein the shaft 4, which is operated from the gear 3, said shaft 4 being connected through the coupling 5 to the drive shaft 6 of the synchronizing mechanism, as will presently appear. The shaft 6, as clearly shown in Fig. 2, is journaled in the bracket 7 upon the base 8 of the synchronizing mechanism casing 9, and upon the inner end of the shaft 6 is mounted the gear 50, which is the medium through which the movable clutch members of the synchronizing device are operated as will later appear.

Figure 5:
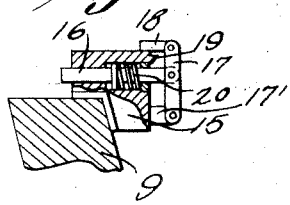
Fig. 5 is an enlarged detail sectional view of a portion of the casing showing the catch for engaging the periphery of the disk platform to hold the same against the normal rotative action due to the rotation of the rotary member of the clutch.
Figure 6:
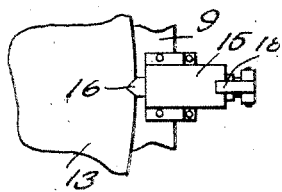
Fig. 6 is a top plan view thereof showing the same in operable engagement with the disk platform.

Mounted in the step bearing 9' concentrically with the base 8 of the casing 9, is a vertical shaft 10, the upper end of which is reduced to provide the conical portion 11 and the record centering pin 12. Mounted upon the conical portion 11 is the geared disk 11', which constitutes the platform carried or carrying member of the clutch, which has disposed thereupon the disk platform 13, which has the eccentrically placed pin 14, the purpose of which will presently appear. In order to lock the platform 13 against the normal tendency to rotate, a casing 15 is attached to the upper rim of the casing 9 and has mounted therein, the reciprocatory trigger or catch 16, which is disposed to engage a recess in the periphery of the platform 13, as clearly shown in Fig. 6, to hold the platform and stationary clutch member 11' in locked relation and until the same is operably connected to be rotated through the shaft 6, as will presently appear. A lever 17 is operably connected to the outer end of the trigger 16, the lower end being pivotally connected in the bracket 17', while the upper end is provided with the pivoted catch 18 disposed to engage the lug 19 of the casing 15 to hold the trigger retracted and out of engagement with the platform, when desired. Disposed upon the trigger 16 to normally maintain the same projected and in resilient engagement with the periphery of the platform 13, is the spring 20, as clearly illustrated in Fig. 5.

Figure 2:
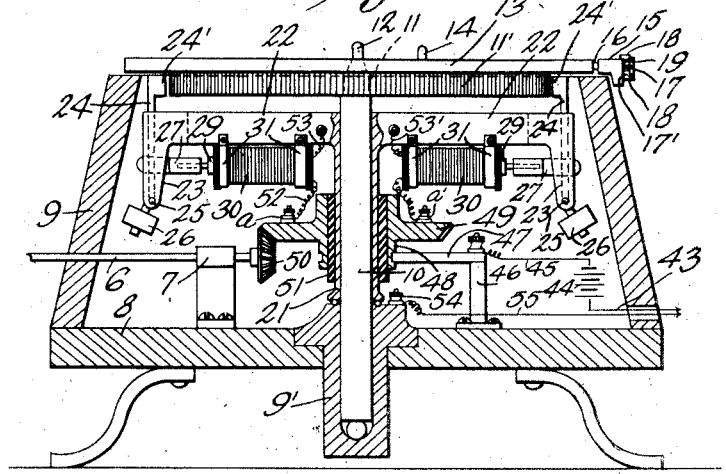
Fig. 2 is a vertical central sectional view through the sound reproducing and synchronizing device casing with the platform carried clutch member in elevation.
Figure 4:
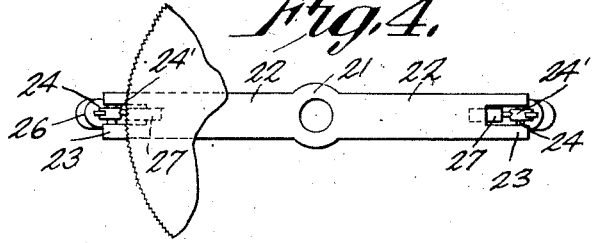
Fig. 4 is a top plan view of the rotating arms and a portion of the platform carrying clutch member.

Mounted anti-frictionally about and for rotation around the vertical shaft 10 is a sleeve 21, which is provided with the oppositely disposed arms 22, as clearly illustrated in Figs. 2 and 4, said arms each being provided with the depending bifurcated lugs or projections 23, between which are pivoted the movable clutch levers 24 provided with the toothed upper ends 24', for engagement at diametrically opposite points to the toothed periphery of the platform carrying clutch member 11'. These clutch levers 24 are pivoted at 25 to the lower end of the bifurcated projections 23, and carry upon their lower ends the pendant weights 26 which tend to normally hold the ends 24' away from the periphery of the clutch member 11'.

Connected to the levers 24 intermediate of their ends is a plate 27, said plate 27 being connected to its respective solenoid core 29, the said solenoid core being operably disposed with relation to its solenoid 30, which as clearly shown is supported through the straps 31 to its respective arm 22. Thus two solenoids 30 are employed to operate the two clutch arms or levers 24, to, as will presently appear, properly engage at the desired time, the clutch member 11', so that the platform 13 may be rotated directly from the projector mechanism.

As clearly shown in Fig. 3, the projector mechanism 1 is provided with the film feeding spools 32 and 33, between which is adapted to be fed as is the usual practice, the film 34, being passed between the two rollers 35 and 38. The roller 35 is disposed in fixed relation to the projector frame 1, while the roller 38 is disposed in the upper end of the pivoted arm 36, whose lower end is pivoted to and insulated at 37 from the projector frame 1. The roller 38 normally tends to hold the lever 36 downwardly and is operated to be moved to and from the roller 34 by means of the projection or stud 39 connected to and carried by the moving film 34. Thus when the projection 39 is disposed between the rollers 35 and 38, the roller 38 is moved upwardly so that when the arm 40 carrying the contact point 40' is moved toward the arm 41 which carries the contact point 41' it thus closes the circuit for energizing the two electromagnets or solenoids 30, as clearly shown in Fig. 3. In order to maintain the contacts 40' and 41' in closed relation after the elevation of the roller 38 by the projection 39 upon the film 34, a pivoted catch 42 is carried by the member 40 and is disposed to engage the upper end of the member 41, the said catch being either gravity or spring actuated and being composed of insulation material so as not to cause the closure of the circuit when the points 40' and 41' are separated.

This switch is opened by the release of the catch 42, such release being manual.

In order that the sleeve 21 and the arms 22 may be rotated from the shaft 6, the gear 50 is in mesh at all times with the gear 49 which is keyed upon the insulating sleeve 51 which in turn is fast upon the sleeve 21, thus the gear 49 is rotated at all times while the projector is being operated so that the arms 22 are also constantly rotated, the clutch members 24 being outward and disengaged from the platform carrying clutch member 11' so that the platform through the catch or trigger 16 is maintained in a stationary position.

In operating the present machine, the film 34 is disposed therewithin as is usual, the button 39 being placed at a predetermined point upon the film so that as the projector is rotated the film is passed therethrough and the projection 39 is brought into engagement with and between the rollers 35 and 38. Previous to this, the shaft 6 has been rotated and through the gears 50 and 49 is rotating the arms 22 and the clutch members 24. As soon as the projection 39 has caused the roller 38 to be elevated and the contacts at 40'—41' are engaged, the electrical circuit as illustrated in Fig. 3 is closed, and both of the solenoids 30 are simultaneously energized to attract their cores and at the same time move both of the clutch members 24 inwardly so that their engaging ends 24' will be placed in engagement at diametrically opposite points to the periphery of the clutch member 11', thus causing the platform 13 and the disk D carried thereby to be rotated at the instant of closure of the contacts 40'—41'.

The catch 42 as before described will maintain the contacts closed and thus continue the energization of the solenoid 30.

The circuit closed consists of the contact 41', the support 41, the conductor 43, the battery 44, the conductor 45, the binding post 46, the resilient contact arm 47, the metal sleeve 48 of the gear 49, the gear 49, the two binding posts a—a', the conductors 52—52', both solenoids 30, the conductors 53—53', the arms 22, the sleeve 21, the binding post 54, the conductor 55, the contact 56 connected to the lever 36, the arm 40 and the contact 40'.

By this means the disk D will be rotated in synchronism with the projector and the film, the catch 42 being released manually when desired to open the circuit and de-energize the solenoids 30 so that the weights 26 will cause the clutch engaging arms 24' of the lever 24 to be freed from the clutch member 11' so that the trigger 16 will offer sufficient resistance to bring the platform 13 and the disk D to a halt.

It is apparent that the catch 42 may be automatically released by attaching an armature thereto and including an offset projection as 39 to operate similar contacts 40'—41', to control an independent circuit containing an electromagnet to attract and release the catch 42.

A depression 57, having led therefrom an upwardly inclined depression 58, is provided at the beginning of the phonic groove of the disk D, the depression 58 terminating in the spiral groove 59. By this means the stylus of the sound reproducing machine may be properly retarded, whereby the stylus will enter the phonic groove at the proper place and time.

As shown in Fig. 9, the disk D is provided with a reinforcing insert 62, having the conical recess 61, which corresponds with the recess 57 formed integral with the disk, thus producing a point in the record, that will withstand the wear of the original introduction of the stylus therewithin.

It is also desirable that the record D be provided with the two apertures 62 and 63, the aperture 62 being the one that fits upon the projecting end 12 of the shaft 10, while the aperture 63 fits upon the stud or pin 14; this arrangement rendering it necessary at all times that the record disk be placed properly upon the platform 13 at the initial starting of the machine, as it is impossible to place the disk flat upon the platform without registering the two pins 12 and 14 with the apertures 62 and 63 which are of different diameters.

From the foregoing description, taken in connection with the drawings, it is evident that the electrically actuated clutch members 24, which are operated due to the projection 39 carried by the film 34, said projection either of metal or any other material and either projecting from both or one side of the film, will at the proper time start the rotation of the record carrier and record D, such time being determined according to the presentation of the image from the film, and due to the fact that the platform 13 is rotated through the synchronizing or transmitting mechanism operated solely from the projector. It is therefore evident that the disk will be rotated in harmony with the film and that therefore the image with the various gestures will be in synchronism with the sound produced by the sound record.

It is also apparent that the mechanism herein shown can be readily applied to any form of projector, the bracket 3 and the couplings 4, 5 and 6 being capable of variations and modifications according to the projector mechanism, and method necessary to connect it with the sound record carrier employed.

Having thus described the invention, what is claimed is:—

1. The combination with the projector of a motion picture machine, of a sound record carrier, a clutch member for the carrier, a rotary clutch member operably connected to the projector, means for operating the rotary clutch member to connect the projector to the record carrier, said means comprising a source of electrical energy, a switch disposed to be closed by the film, a lock for holding the switch closed after the switch has been actuated, an electromagnet operably connected to the rotary clutch member, and a circuit including the source of electrical energy, the switch and the electromagnet, whereby when the circuit is closed, the electromagnet is energized and the clutch members held engaged.

2. The combination with the projector of a motion picture machine, its operating mechanism, a film having an abutment thereon at a predetermined point, and a sound record carrier, of mechanism for operating the carrier from the projector operating mechanism, including a clutch member connected to the record carrier, a rotating clutch member operably connected to the projector operating mechanism, a source of electrical energy, a switch disposed in the path of the film to be closed by the abutment on the film, means for holding the switch closed after the switch has been actuated, an electromagnet operably connected to the rotating clutch member for operating the same, and a circuit including the source of electrical energy, the switch and the electromagnet.

In testimony that I claim the foregoing as my own, I have hereto affixed my signature in the presence of two witnesses.

HARRISON W. ROGERS.

Witnesses:
S. C. ADAMS,
F. S. WILLARD.